(12) United States Patent
Scalzi et al.

(10) Patent No.: US 7,129,388 B2
(45) Date of Patent: Oct. 31, 2006

(54) METHOD FOR ACCELERATED DECHLORINATION OF MATTER

(75) Inventors: Michael Scalzi, Doylestown, PA (US); Wade Meese, Worthington, OH (US)

(73) Assignee: Innovative Environmental Technologies, Inc., Doylestown, PA (US)

( * ) Notice: Subject to any disclaimer, the term of this patent is extended or adjusted under 35 U.S.C. 154(b) by 597 days.

(21) Appl. No.: 10/610,558

(22) Filed: Jul. 2, 2003

(65) Prior Publication Data

US 2004/0133059 A1    Jul. 8, 2004

Related U.S. Application Data

(60) Provisional application No. 60/437,983, filed on Jan. 6, 2003.

(51) Int. Cl.
*A62D 3/00* (2006.01)

(52) U.S. Cl. .................. 588/316; 588/402; 588/406

(58) Field of Classification Search ............ 588/313, 588/315, 316, 318, 319, 320, 402, 406, 415, 588/261; 423/240 R, 240 S
See application file for complete search history.

(56) References Cited

U.S. PATENT DOCUMENTS

| | | | |
|---|---|---|---|
| 4,488,850 A | 12/1984 | Wernimont |
| 5,264,018 A | 11/1993 | Koenigsberg et al. |
| 5,277,815 A | 1/1994 | Beeman |
| 5,411,664 A | 5/1995 | Seech et al. |
| 5,602,296 A | 2/1997 | Hughes et al. |
| 5,833,855 A | 11/1998 | Saunders |
| 5,975,798 A | 11/1999 | Liskowitz et al. |
| 6,068,777 A | 5/2000 | Kimura et al. |
| 6,150,157 A | 11/2000 | Keasling et al. |
| 6,238,570 B1 | 5/2001 | Sivavec |
| 6,245,235 B1 | 6/2001 | Perriello |
| 6,255,551 B1 | 7/2001 | Shapiro et al. |
| 6,265,205 B1 | 7/2001 | Hitchens et al. |
| 6,303,367 B1 | 10/2001 | Kataoka et al. |
| 6,312,605 B1 | 11/2001 | Kerfoot |
| 6,344,355 B1 | 2/2002 | Hince et al. |
| 6,420,594 B1 | 7/2002 | Farone et al. |
| 6,464,864 B1 | 10/2002 | Sivavec |
| 6,472,198 B1 | 10/2002 | Semprini et al. |

*Primary Examiner*—Edward M. Johnson
(74) *Attorney, Agent, or Firm*—Gregory J. Gore

(57) ABSTRACT

Accelerated dechlorination of soil and water contaminated with chlorinated solvents is achieved by stimulating anaerobic microorganisms and thus increasing the rate of biological mineralization of the solvents. This is accomplished by a treatment process consisting of colloidal suspension of iron powder, polylactate ester such as glycerol tripolylactate, xylitol pentapolylactate, and sorbitol hexapolylactate, chemical oxygen scavengers in solution with essential nutrients, and vitamin stimulants such as B2 and B12 delivered via compressed gases N or C02 so as not to oxygenate an environment targeted for anaerobic processes. The treatment stimulates naturally occurring microorganisms while oxidizing dissolved phase target compounds via the surface action of the iron particles resulting in the breakdown of chlorinated solvents such as tetrachloroethene, trichloroethene, carbon tetrachloride and their daughter products.

10 Claims, 1 Drawing Sheet

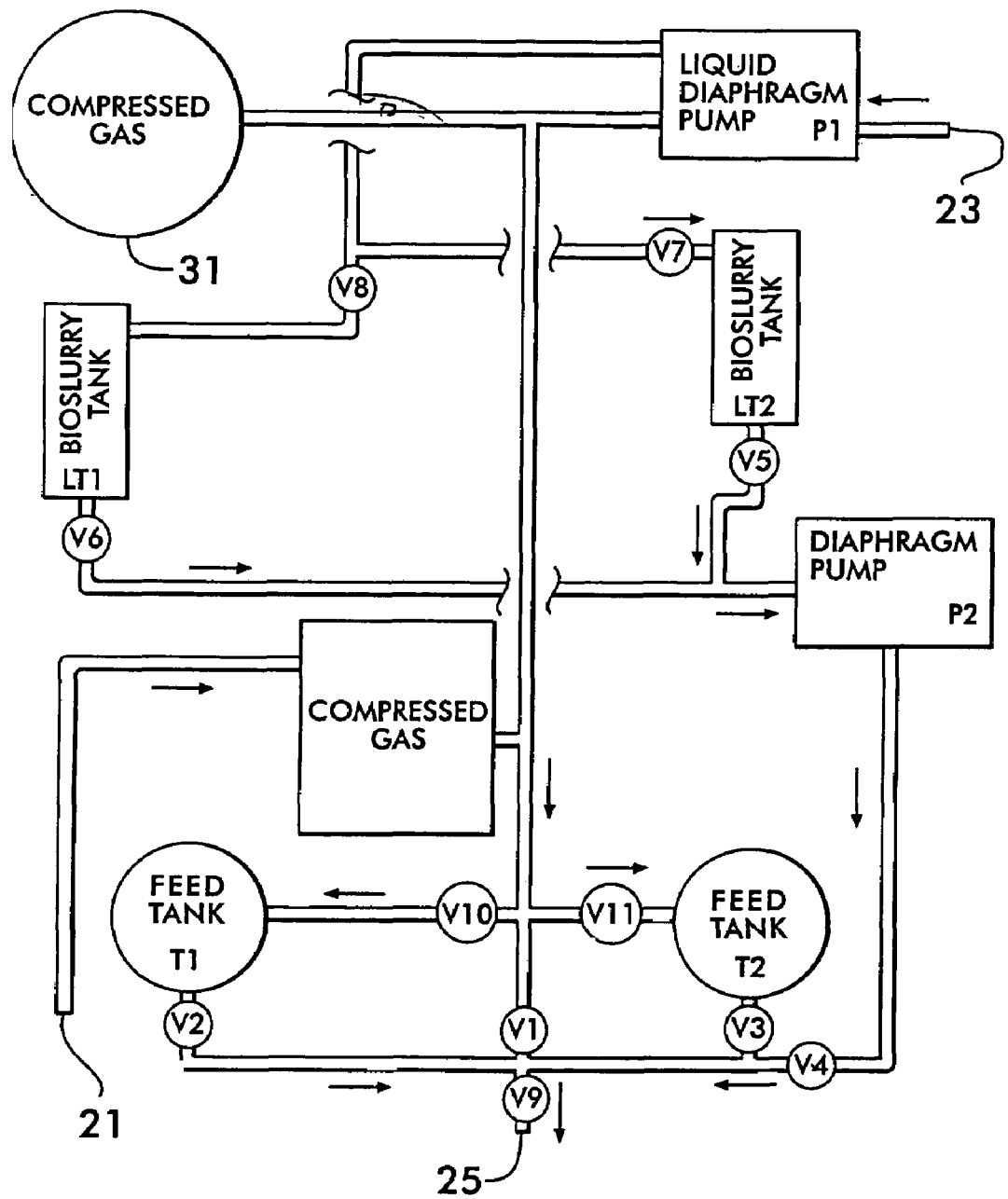

METHOD FOR ACCELERATED DECHLORINATION OF MATTER

The present application is related to provisional patent application Ser. No. 60/437,983 entitled "Method for Accelerated Dechlorination of Matter" filed on Jan. 6, 2003, priority from which is hereby claimed.

FIELD OF THE INVENTION

The present invention relates to the combined and synergistic utilization of chemical oxidation and bio-mineralization of subsurface soil pollutants. More specifically, it relates to an accelerated dechlorination of subsurface matter by anaerobic microorganisms in conjunction with the oxidation of dissolved chlorinated compounds using zero valent iron.

BACKGROUND OF THE INVENTION

Through the years, chlorinated solvents have had a large impact on several industries, including pharmaceuticals, chemical processing, food extraction, dry cleaning, and metal cleaning. With wide spread use and improper handling and storage, extensive soil and water damage has occurred. Due to their toxicity, carcinogenicity, and persistence in the environment, chlorinated solvents are listed by the United States Environmental Protection Agency as high priority pollutants. If left untreated, chlorinated solvents may remain unchanged for a period of fifty years or more. The most common chlorinated solvents used are methylene chloride, tetrachloroethene, trichloroethene, carbon tetrachloride, chloroform, tetrachloroethane, dichloroethene and vinyl chloride. Carbon tetrachloride is a systematic poison of the nervous system, the intestinal tract, the liver, and the kidneys. Vinyl chloride and methylene chloride are known carcinogens, and could also affect the nervous system, the respiratory system, the liver, the blood, and the lymph system.

Chlorinated solvents are often found in separate phases mixtures commonly referred to as dense nonaqueous-phase liquids ("DNAPLs"). DNAPLs are visible, denser-than-water, separate oily phase materials in the subsurface whose migration is governed by gravity, buoyancy, and capillary forces. Chlorinated solvents partition into the water phase to create a dissolved contaminant plume when in contact with water, thus creating a long-term, continuing source of contamination as the soluble constituents slowly dissolve into moving groundwater.

One common technique for treating contaminated matter is the "pump-and-treat" method in which contaminated groundwater is pumped to the surface, cleaned chemically or by passing the groundwater through a bioreactor, and then reinjected into the groundwater. This process is carried out over a long period and various factors complicate the removal of these contaminants from the environment. Also, they are very volatile, highly mobile, denser than water, and generally found in the environment as mixtures of products with different degrees of chlorination. The "pump-and-treat" method is therefore problematic.

The problems with the "pump-and-treat" method can be overcome with the use of anaerobic microorganisms which have the capability to decompose a wide range of highly chlorinated compounds. However, anaerobic microorganisms are at a disadvantage in that their growth is slow when compared to that of aerobic organisms. In-situ they are at an even greater disadvantage due to the partitioning of the targeted substrates into the soil matrix. There is therefore a need in the art to utilize the ability of anaerobic microorganisms to decompose chlorinated compounds which can be achieved at a faster rate.

SUMMARY OF THE INVENTION

The present invention achieves accelerated dechlorination of soil and water contaminated with chlorinated solvents by stimulating anaerobic microorganisms and thus increasing the rate of biological mineralization of the solvents. This is accomplished by a treatment process consisting of a colloidal suspension of iron powder (ZVI), polylactate ester, such as glycerol tripolylactate, xylitol pentapolylactate, and sorbitol hexapolylactate, chemical oxygen scavengers in solution with essential nutrients, and vitamin stimulants such as B2 and B12 delivered via compressed gases N or CO2 so as not to oxygenate an environment targeted for anaerobic processes. The treatment stimulates naturally occurring microorganisms while oxidizing dissolved phase target compounds via the surface action of the iron particles resulting in the breakdown of chlorinated solvents such as tetrachloroethene, trichloroethene, carbon tetrachloride and their daughter products. The incorporation of the B12 acts as both an enzymatic stimulus for the anaerobic action and a surface catalyst of the iron particle. Cobalt, the core element of the B12, enhances the surface oxidation of the iron further.

A closed delivery system is used to deliver the process utilizing a combination of gas and liquid delivery systems. All of the vessels are interconnected and valved, allowing for mixings, washings, filling, and discharge of materials via pressure vessels or mechanical pumping systems. The system utilized allows for a variety of dissimilar compounds to be delivered via a single injection line. Further, the switching between feed systems is accomplished without any loss of pressure to the delivery line eliminating the common problems experienced from the vacuum developed downhole as pressure is released and reapplied. Lastly, the current system is fully self-contained requiring no electrical supply. The only site utility requirement is an available water source for slurry preparation.

One embodiment of the present invention is carried out in the following steps.

Step 1: Subsurface Pathway Development

Initially, a gas is delivered to the subsurface via the delivery system further described herein. The gas is used so as not to introduce oxygen into an environment targeted for anaerobic processes. Injection points are advanced via traditional direct push technology or may be permanently installed injection wells. The gas is introduced at approximately 175 psi such that delivery pathways and voids are established. Pathway development is verified by observing a substantial pressure drop at the surface monitoring point.

Step 2: Sodium Sulfate, Nutrient and Micro Nutrient Injection

A solution of sodium sulfite and nutrients (nitrogen and ortho-phosphate) is immediately injected into the subsurface fractures and voids that were developed during the gas injection step. Sodium sulfite acts as an oxygen scavenger, iron reducer and sulfate source. As an oxygen scavenger, the sodium sulfite prevents the oxidation of the later-injected ZVI by the dissolved oxygen while promoting anaerobic conditions that are favorable for the biodegradation of the CVOCs. Nutrients, injected as organic ammonia and ortho-phosphate, are required for the maintenance of the microbial metabolic pathways, ATP/ADP synthesis and organelle development.

Step 3: Zero Valent Iron (ZVI) Injection

Immediately following the sodium sulfite/bioslurry solution injection, ZVI is added to an additional quantity of the bioslurry solution and the colloidal suspension is injected to reduce concentrations of dissolved-phase CVOCs while providing for rapidly generated hydrogen for the microbial stimulation.

Step 4: Anaerobic Hydrogen Source Injection

An anaerobic organic hydrogen source is injected immediately after the ZVI injection to provide a slow release hydrogen source for the anaerobic dechlorination of the CVOCs. Vitamin B12 and riboflavin B2 is mixed with the anaerobic stimulating hydrogen source to provide essential micro enzymes at the anaerobic sites.

Step 5: Sodium Sulfite/Nutrient Injection

A second injection of the sulfite/nutrient mixture is then performed to clear the injection lines and to provide for in-situ mixing and penetration of the anaerobic stimulating product.

Step 6: Post Liquid Injection—Gas Injection

Lastly, the injection lines are cleared of liquids by a second gas injection and all injectants are forced into the created formation and upward into the vadose zone. Once the injection cycle is complete, the injection point is temporarily capped to allow for the pressurized subsurface to accept the injectants. Once back-pressure diminishes, the injection rods are extracted. Injection boring locations are then sealed with bentonite or sand to prevent short-circuiting from adjacent injection locations.

Other objects and advantages of the present invention will be readily apparent to those of skill in the art from the following drawing and description of the preferred embodiment.

BRIEF DESCRIPTION OF THE DRAWINGS

The FIGURE is an apparatus and flow diagram which describes an in-situ delivery system of the present invention.

DETAILED DESCRIPTION OF THE PREFERRED EMBODIMENT

According to the preferred embodiment of the invention, the following process and delivery system apparatus is employed. In order to keep an anaerobic environment, nitrogen or carbon dioxide gas is used to propel all injectants into the subsurface. The gas is first injected into the subsurface at approximately 175 pounds per square inch until a significant pressure drop is observed at the injection pressure vessel. This process is referred to as pre-injection fracturing with the intent of opening pathways into the subsurface for the injections. These pathways are believed to be those more permeable pathways along which chlorinated solvents are more likely to have migrated, both in the vadose and saturated zones. Liquid and liquid-entrained injectants are then delivered with pressurized gas to the pathways that are produced during the fracturization step.

Chemical oxygen scavengers, reducing agents such as sodium sulfite, are then injected to remove oxygen from groundwater and soil moisture immediately after fracturization of the subsurface, facilitating the anaerobic conditions that are preferred for the reductive dehalogenation of chlorinated solvents by indigenous bacteria. The resulting environment contains a wide spectrum of inorganic, biochemical, and enzymatic redox systems. Along with the reducing agents, nutrients such as organic ammonia and ortho-phosphate are added to the injectants in order to support microbial activity.

In an anaerobic environment, zero valent iron (ZVI) is then injected as an additive to the reducing agent bioslurry mixture. Zero valent iron has a moderately low toxicity and a good reducing power so that it can rapidly reduce higher concentrations of dissolved phase chlorinated solvents when injected via direct chemical reactions. Zero valent iron will continue to react with dissolved chlorinated solvents in groundwater until it is completely oxidized by chlorinated solvents, oxygen, or other oxidants that contact residual concentrations of zero valent iron. Under normal environmental conditions, zero valent iron is capable of being oxidized and reduced back and forth. The oxygen scavenger also promotes an anaerobic environment, stimulating the microorganisms.

With the addition of an electron donor source to provide hydrogen, the biodegradation process is initiated. A polylactate ester, such as glycerol tripolylactate, xylitol pentapolylactate, or sorbitol hexapolylactate, is now injected with the intent of being cometabolized by indigenous anaerobic bacteria to produce dechlorinating conditions necessary for indigenous anaerobic bacteria to biodegrade residual concentrations of chlorinated solvents. This slow release process is controlled over time, maintaining a slow delivery of hydrogen at low concentrations which drives the anaerobic reductions. The lactic acid is then metabolized by indigenous bacteria to produce hydrogen, which can then be metabolized by chlorinated solvent degrading bacteria. Lactic acid, hydrogen, nutrients, and bacteria then move with groundwater, enhancing the attenuation of chlorinated solvents as they move through the aquifer over a period of months.

The above-described process is preferably carried out by an apparatus such as shown in the diagram of the FIGURE. The conduit pathways for the fluids transported by this apparatus are shown in solid lines for the transfer of gases and dotted lines for the transport of fluids. The direction of flow is indicated by arrows where appropriate. Not shown are conventional injection rods well-known in the art suitable for subsoil injections which are attached to an injection line in fluid communication with the discharge port 25.

An embodiment of the inventive process begins by first filling the bioslurry tanks LT1 and LT2 and filling the feed tanks T1 and T2. A source of gas such as nitrogen or carbon dioxide is connected to inlet 21 and a water supply is connected to liquid inlet 23. Valves V7 and V8 are opened which engage an electric actuator to fill bioslurry tanks LT1 and LT2. The micro-nutrients/sodium sulfate is then manually added to the bioslurry tanks LT1 and LT2 and allowed to mix. Valves V7 and V8 are closed along with disengaging the actuator when the bioslurry tanks are filled.

Next, a pre-mixed heated lactate including vitamins B2 and B12 is manually poured into feed tank T1. Valves V5, V6, V4, and V3 are then opened. Next, pump P2 is activated and tank T2 is filled with an appropriate volume of the bioslurry. All valves are closed when finished. The tops are then secured on both feed tanks T1 and T2 and afterward valves V10 and V11 are opened to pressurize both feed tanks. After the injection rod has been properly placed at a selected location, the injection line is secured to discharge port 25 and valve V9 is opened.

The injection process begins when valve V1 is opened to create the injection pathways until a significant pressure drop is observed at the injection pressure vessel 31 which is filled with the source of compressed gas, preferably either nitrogen or carbon dioxide. Valve V1 is then closed and valve V3 opened to introduce the bioslurry mixture into the subsurface pathways from feed tank T2. Valve V3 is closed when feed tank T2 is empty.

Next, pump P2 is once again activated and tank T2 is filled with more of the bioslurry. Zero valent iron is then manually added and mixed with the bioslurry in tank T2. This mixture is then injected into the subsoil from tank T2 in the same way as the previous injection of the bioslurry mixture alone.

Now valve V2 is opened to introduce the lactate mixture into the subsurface from tank T1 and is closed after the tank is empty. Valves V4, V5, and V6 are then opened to directly deliver bioslurry from tanks LT1 and LT2 into the subsurface. All valves are closed when the desired amount of bioslurry has been injected. Finally, in order to cleanse the injection line of the viscous polylactate ester, more reducing agent slurry is once again injected from tank T2 having been transferred there from tanks LT1 and LT2 as previously described. With the injections complete, a post injection line purge is performed by opening valves V9 and V1 and injecting gas to clear the lines of any remaining reducing agents. With the lines cleaned, the process is complete and the next injection location is prepared.

In accordance with the invention, a test was carried out and the following results observed. A site known to be contained with chlorinated solvents was geologically mapped. After determination of the subsurface contaminate concentrations, characteristics and the direction of flow of groundwater, a series of injection points were drilled. Contaminate concentrations of cis-1,2-DCE prior to the biodegradation process ranged from 6.6 ppb to 69 ppb. The initial concentration of VC ranged from 0.97 to 2 ppb. The initial concentration of TCE ranged from 0.23 to 12.0 ppb.

After determining the levels of the contaminants, biodegradation was initiated and maintained by the addition of iron powder, lactate, reducing agents, vitamin stimulants, and delivered by compressed gases and results were observed after four months. Iron powder was chosen for two primary reactions with chlorinated solvents, the first being the anaerobic iron corrosion reaction in which water is disassociated to form hydrogen gas, and the direct absorption of a chlorinated hydrocarbon onto the surface of the iron, followed by reductive dehalogenation. Four mechanisms are at work during the reductive process. First, the ZVI acts as a reductant by supplying electrons directly from the metal surface to an absorbed halogenated compound. Next, hydrogen gas is generated by the anaerobic corrosion of the metallic iron by water. Third, metallic iron may act as a catalyst for the reaction of hydrogen with the halogenated hydrocarbon using the hydrogen produced on the surface of the iron metal as the result of anaerobic corrosion with water. Fourth, solubilized ferrous iron can also act as a reductant, albeit at a rate at least an order of magnitude slower.

At the end of the four month process, microbial processes are strongly active as demonstrated by the disappearance of tetrachloroethane, 1, 1-TCA, and dichloromethane. The alkaline conditions over the four months would suggest that the chloride production observed is primarily due to the microbial dechlorination process. The 4,600 ppb increase in chlorides observed over the period suggest significant microbial activity. There appears to be no toxicity issues in any of the areas on site and there has not been any microbial accumulation of intermediates of the degradation pathways.

As a by-product of the program, benzene has also been addressed in those areas where it has been found in the groundwater samples.

Therefore the foregoing description of the invention demonstrates that it provides a method for accelerated dechlorination of matter contaminated with chlorinated solvents utilizing mechanisms associated with zero valent iron oxidation. It shows that with the combination of lactic acid, oxygen scavengers, nutrients and zero valent iron, when added to matter contaminated with chlorinated solvents, can provide a reducing environment. Thus, the compounds disclosed have shown great utility in aiding the destruction or inactivation of chlorinated solvents. The invention also confirms that iron powder, when added with other compounds which provide a source of electron donors, nutrients, and reducing agents, will stimulate naturally occurring microorganisms while oxidizing dissolved phase target compounds via the surface action of the iron particles resulting in the breakdown of chlorinated solvents.

It should be understood that there may be other modifications and changes to the present invention that will be obvious to those of skill in the art from the foregoing description, however, the present invention should be limited only by the following claims and their legal equivalents.

The invention claimed is:

1. A method for accelerated anaerobic dechlorination of subsoil matter, comprising:
    placing an injection rod into a soil to be treated to carry injectants under pressure to the soil;
    injecting a soil fracturizing gas under pressure through said injection rod and into said soil to establish fluid pathways therein;
    injecting a reducing agent under pressure through said rod and said soil pathways to remove oxygen from groundwater and soil moisture;
    injecting a mixture under pressure including zero valent iron through said rod and into said soil pathways to react with the dissolved chlorinated solvents in the groundwater; and
    injecting a polylactate ester mixture under pressure through said rod into the soil pathway to produce dechlorinating conditions such that indigenous anaerobic bacteria biodegrade residual concentrations of chlorinated solvents.

2. The method of claim 1 wherein said reducing agent is sodium sulfite.

3. The method of claim 2 wherein said polylactate mixture further includes vitamins B2 and B12.

4. The method of claim 1 wherein the mixture further includes nutrients.

5. The method of claim 4 wherein said nutrients are organic ammonia and ortho-phosphate.

6. The method of claim 5 wherein said polylactate ester is from the group consisting of glycerol tripolylactate, xylitol pentapolylactate, and sorbitol hexapolylactate.

7. The method of claim 6 wherein said fracturizing gas is from the group of nitrogen and carbon dioxide.

8. The method of claim 7 wherein said zero valent iron mixture is a colloidal suspension in a sodium sulfite solution.

9. The method of claim 8 further including, after the step of injecting the polylactate ester, an additional step of injecting into the soil a sodium sulfite and nutrient solution to provide for further in-situ mixing and penetration of anaerobic stimulating products.

10. The method of claim 9 further including a final step of gas injection to clear said injection rod and fluid conduit lines connected thereto.

* * * * *

UNITED STATES PATENT AND TRADEMARK OFFICE
CERTIFICATE OF CORRECTION

| | | |
|---|---|---|
| PATENT NO. | : 7,129,388 B2 | Page 1 of 1 |
| APPLICATION NO. | : 10/610558 | |
| DATED | : October 31, 2006 | |
| INVENTOR(S) | : Michael Scalzi and Wade Meese | |

It is certified that error appears in the above-identified patent and that said Letters Patent is hereby corrected as shown below:

Column 4,

Lines 37-39, "The conduit pathways for the fluids transported by this apparatus are shown in solid lines for the transfer of gases and dotted lines for the transport of fluids." should be deleted.

Signed and Sealed this

Second Day of January, 2007

JON W. DUDAS
*Director of the United States Patent and Trademark Office*